Patented Oct. 5, 1926.

1,602,162

UNITED STATES PATENT OFFICE.

EUDO MONTI, OF TURIN, ITALY.

POMACE EXTRACT.

No Drawing.     Application filed May 27, 1921. Serial No. 473,084.

The present application is a continuation in part of my application, Ser. No. 123,563, filed October 3rd, 1916.

It is a well known fact that fresh grapes, also other fruits and berries, contain acids, salts, vitamines, organic iron, organic phosphorous, assimilable proteins, lipoids, and glycerophosphates which aid digestion and stimulate metabolism and will therefore improve the health of weak persons as is proven by the fact that very many people are benefitted by grapes. It is also known that Italian, French and Spanish grape growers whose diet consists of very poor and coarse foods such as corn polenta, rice, poor soggy bread, turnips and the like are very much benefitted by the so-called piquette, agresto and the like obtained by exhausting fermented grape pomace with water to which some vinegar or some other acid product is often added.

It is also known that after the usual wine was forbidden many people tried to substitute for it sterilized grape juice but the attempt in many cases failed because grape juice sterilized at a high temperature (as is necessary to make it keep) does not contain in an unalterd condition the enzymes salts and acids and the other invigorating substances contained in fresh grapes. Also people who are in the habit of drinking dry wine do not like the sweet taste of the sugar contained in grape juice extracted from the pulp of the grapes. Experience has also taught me that most of the valuable principles contained in grapes, berries and the like are to be obtained in greatest quantity in the layer of the pulp which adheres to the skin and generally remains in the pomace as the stemmed grapes are crushed and pressed.

In my U. S. Patent 1,167,006, also in my Patent 1,401,351, I have disclosed and claimed a proceeding which allows me to obtain unaltered integral grape juice containing all the non-sugary extract of said grapes and pomace, including the acids, salts, enzymes, vitamines, and the like, originally contained in such fruits and berries. Such preparations, contain considerable sugar which is disliked by many who prefer dry wine and is even positively injurious to many people affected by certain diseases or having a tendency to contract such diseases.

In my present application I propose to describe a product in which these objections are eliminated. I have found that the extract of unfermented fruit or berry pomace containing most of the non-sugary extractive matter, especially the coloring matter, is rich in organic iron, organic phosphorus, unaltered enzymes, vitamines, etc., and a percentage of grape sugar which is less than fifty per cent of the total solids, is a very valuable product much more invigorating, active and healthful than grape juice obtained in the usual way.

I prepare said product from grapes by stemming, crushing, and as far as possible seeding the grapes and then pressing them gradually in the same manner used in making white or pale colored wine from dark colored grapes or green or almost colorless wine from yellow grapes. The juice thus extracted contains most of the sugar and some of the acid, also much of the cream of tartar contained in the grapes or fruit. (The acid and tartar being later removed from such juice in order to use in exhausting the pomace.) Such juice however contains little of the coloring matter and other complex substances usually known as nonsugary extract. I exhaust then the crushed, pressed and as far as possible seeded, unfermented pomace, in the manner described in my Patent 1,401,351 but at a temperature not exceeding 40° C. with water to which a small percentage of sulfurous and tartaric acids have been added. I eliminate afterwards the sulfurous acid in the way described in the above mentioned U. S. patents and patent applications. Afterwards I concentrate the extract, preferably by a combination of the freezing and vacuum evaporation methods as set forth in my U. S. Patent 1,379,470. Afterwards instead of mixing the product obtained with the juice obtained from the pulp to make integral grape juice, I concentrate it by the freezing process, which will remove the pectin and certain other colloids which will remain in the ice, to a specific gravity of about 1.250 and afterwards mix it with some extract previously concentrated in the luke warm water heated vacuum evaporator to a specific gravity of about 1.400. The mixture of the two concentrates should be such that a specific gravity of about 1.300, corresponding to a total solid content of about 60%, will result. The extract will keep in such condition and is a new and useful product containing all the available important material contained in the fresh unfermented pomace from which it has been derived. Such product is soluble in plain or carbonated water in all proportions giving a perfectly clear though highly colored solution which contains a small percentage of sugar but owing to the much larger percentage of non-sugary matter does not taste sweet but has the same appearance and taste as wine made with the grapes from which the pomace has been separated, and will have the same beneficial effects as wine and especially of piquette, and agresto though it does not contain any alcohol and will therefore benefit people who do not like or cannot use sugary drinks and are not allowed to use alcoholic drinks.

I claim:

1. A concentrated extract of fruit pomace from which the juice of the first pressing has been removed, said extract containing less than 50% of the sugar, pectin and other colloids of the raw fruit but substantially all of the non-sugary crystalloid extract of said fruit in an unaltered condition.

2. A syrup compound comprising concentrated fruit pomace extract from which the pectin and other colloids have been removed and concentrated whole pomace extract, said compound containing less than 50 per cent of the sugar, pectin and other colloids of the raw fruit, but substantially all of the non-sugary crystalloid extract of said fruit in an unaltered condition.

3. A syrup compound comprising fruit pomace extract from which the pectin and other colloids have been removed, concentrated to a specific gravity of substantially 1.250 and whole fruit pomace extract concentrated to a specific gravity of substantially 1.400, said compound having a specific gravity of substantially 1.300 and containing less than 50 per cent of the sugar, pectin and other colloids of the raw fruit but substantially all of the non-sugary crystalloid extract of said fruit in an unaltered condition.

EUDO MONTI.